United States Patent
Huo

(10) Patent No.: US 10,928,669 B1
(45) Date of Patent: Feb. 23, 2021

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Yingdong Huo, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/770,781

(22) PCT Filed: Apr. 9, 2020

(86) PCT No.: PCT/CN2020/083880
§ 371 (c)(1),
(2) Date: Jun. 8, 2020

(30) Foreign Application Priority Data

Mar. 11, 2020 (CN) .......................... 202010167034.5

(51) Int. Cl.
G02F 1/1335 (2006.01)

(52) U.S. Cl.
CPC .. *G02F 1/133512* (2013.01); *G02F 1/133514* (2013.01); *G02F 1/133526* (2013.01); *G02F 1/133553* (2013.01); *G02F 2201/08* (2013.01)

(58) Field of Classification Search
None
See application file for complete search history.

(56) References Cited

U.S. PATENT DOCUMENTS

| 5,455,694 A | * | 10/1995 | Ariki | G02F 1/133526 348/E9.027 |
| 5,825,443 A | * | 10/1998 | Kawasaki | G02F 1/133621 349/95 |
| 6,295,107 B1 | * | 9/2001 | Watanabe | G02F 1/133512 349/110 |
| 2001/0046025 A1 | * | 11/2001 | Ishii | G02F 1/133308 349/158 |
| 2004/0240777 A1 | * | 12/2004 | Woodgate | G02B 30/25 385/16 |
| 2006/0098296 A1 | * | 5/2006 | Woodgate | H04N 13/305 359/642 |
| 2007/0171493 A1 | * | 7/2007 | Nakanishi | G02F 1/134309 359/15 |
| 2010/0149450 A1 | * | 6/2010 | Okumura | G02F 1/134336 349/57 |
| 2012/0242915 A1 | * | 9/2012 | Ozawa | G02F 1/133526 349/5 |
| 2016/0085118 A1 | * | 3/2016 | Lee | G02F 1/133512 349/62 |

(Continued)

*Primary Examiner* — Ryan Crockett

(57) ABSTRACT

A display panel and a display device are provided. The display panel includes a plurality of liquid lenses having a light exiting side; a light absorbing layer disposed on the light exiting side of the liquid lenses, wherein the light absorbing layer is provided with a plurality of grooves corresponding to the liquid lenses, and focal points of the liquid lenses are located in the corresponding grooves; and a reflective layer covering bottoms of the grooves, wherein the bottoms of the grooves are away from the liquid lenses.

18 Claims, 2 Drawing Sheets

(56) References Cited

U.S. PATENT DOCUMENTS

| | | | |
|---|---|---|---|
| 2018/0239189 A1* | 8/2018 | Koito | G02F 1/1323 |
| 2019/0179074 A1* | 6/2019 | Choi | G02B 6/0051 |
| 2019/0324346 A1* | 10/2019 | Lee | G03B 5/02 |
| 2020/0271990 A1* | 8/2020 | Kajita | G02F 1/133528 |

* cited by examiner

1 …

DISPLAY PANEL AND DISPLAY DEVICE

FIELD OF INVENTION

The present disclosure relates to the field of display technologies, and more particularly, to a display panel and a display device.

BACKGROUND OF INVENTION

Current display panels can be divided into two categories according to different dimming types. One category is self-luminous display panels, such as plasma display panels (PDPs), light-emitting diode (LED) display panels, organic light-emitting diode (OLED) display panels, quantum light-emitting diode (QLED) display panels, perovskite light-emitting diode (PeLED) display panels, etc. The other category is light modulation type display panels, such as thin film transistor liquid crystal display panels (TFT-LCDs), liquid crystal on silicon (LCOS) display panels, electronic papers (E-papers), etc.

However, current light modulation type display panels are easily affected by reflected light, thereby resulting in poorer display effect.

Therefore, it is necessary to provide a display panel and a display device to solve the problem in current technology.

SUMMARY OF INVENTION

An objective of the present disclosure is to provide a display panel and a display device to improve display effect.

To solve the above problem, an embodiment of the present disclosure provides a display panel. The display panel comprises:

a plurality of liquid lenses having a light exiting side;

a light absorbing layer disposed on the light exiting side of the liquid lenses, wherein the light absorbing layer is provided with a plurality of grooves corresponding to the liquid lenses, and focal points of the liquid lenses are located in the corresponding grooves; and a reflective layer covering bottoms of the grooves, wherein the bottoms of the grooves are away from the liquid lenses.

The display panel of the present disclosure further includes:

a color resist layer comprising a plurality of color filter resists corresponding to the grooves, wherein the color filter resists are disposed in the grooves and adjacent to the reflective layer.

In the display panel of the present disclosure, the reflective layer is in contact with the focal points of the liquid lenses.

In the display panel of the present disclosure, areas of tops of the grooves are greater than areas of the bottoms of the grooves, and the tops of the grooves are adjacent to a side of the liquid lenses.

In the display panel of the present disclosure, longitudinal cross-sectional shapes of the grooves are inverted trapezoidal.

In the display panel of the present disclosure, the grooves penetrate through the light absorbing layer, and the reflective layer is disposed on one side of the light absorbing layer away from the liquid lenses.

In the display panel of the present disclosure, the liquid lenses are disposed on a same horizontal plane.

In the display panel of the present disclosure, when the display panel is in a first state, the liquid lenses converge light incident thereon; and when the display panel is in a second state, the liquid lenses do not converge the light incident thereon.

In the display panel of the present disclosure, each of the liquid lenses comprises a liquid droplet, an insulating layer, and an electrode in sequence from top to bottom, the liquid droplet receives a first power supply voltage, the electrode receives a second power supply voltage, and the first power supply voltage is greater than the second power supply voltage.

An embodiment of the present disclosure further provides a display device, which includes the above display panel.

The display panel and the device of the present disclosure include: a plurality of liquid lenses having a light exiting side; a light absorbing layer disposed on the light exiting side of the liquid lenses, wherein the light absorbing layer is provided with a plurality of grooves corresponding to the liquid lenses, and focal points of the liquid lenses are located in the corresponding grooves; and a reflective layer covering bottoms of the grooves, wherein the bottoms of the grooves are away from the liquid lenses. Synergistic effect of the liquid lenses and the grooves changes an intensity of light per unit area, thereby controlling an intensity of reflected light, preventing the reflected light from causing an influence on display effect, and improving the display effect.

DETAILED DESCRIPTION OF PREFERRED EMBODIMENTS

Figure 1:
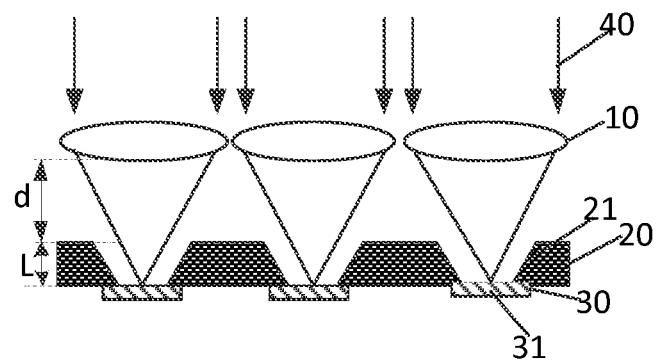
FIG. 1 is a schematic structural diagram of a display panel in a first state according to an embodiment of the present disclosure.
Figure 2:
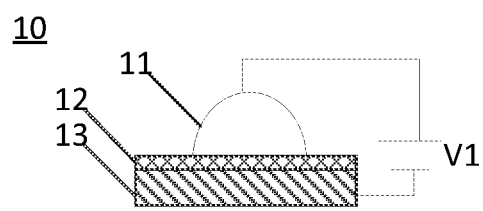
FIG. 2 is a schematic structural diagram of a liquid lens applied with a first voltage according to an embodiment of the present disclosure.
Figure 3:
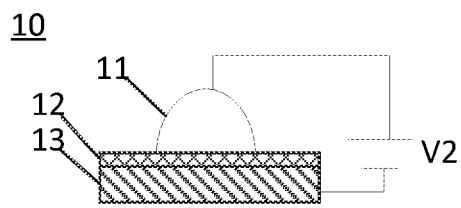
FIG. 3 is a schematic structural diagram of the liquid lens applied with a second voltage according to an embodiment of the present disclosure.

The specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. Therefore, the directional terms used are to illustrate and understand the present disclosure, not to limit the present disclosure. The identical or similar reference numerals constantly denote the identical or similar elements or elements having the identical or similar functions in the drawings.

The terms "first", "second", and the like in the description, claims, and the above-mentioned drawings of the present disclosure are used to distinguish different objects, and are not used to describe a specific order. In addition, the term "comprises", "have", and their variations are intended to cover a non-exclusive inclusion.

Referring to FIGS. 1 to 5, FIG. 1 is a schematic structural diagram of a display panel in a first state according to an embodiment of the present disclosure.

As shown in FIG. 1, a display panel in the embodiment of the present disclosure includes a plurality of liquid lenses 10, a light absorbing layer 20, and a reflective layer 30.

In an embodiment of the present disclosure, when the liquid lenses 10 are disposed on a top of the display panel, a light exiting side is under the liquid lenses 10. Wherein, light 40 is ambient light. Combined with FIG. 2 and FIG. 3, each of the liquid lenses 10 comprises a liquid droplet 11, an insulating layer 12, and an electrode 13 in sequence from top to bottom, the liquid droplet 11 receives a first power supply voltage (not shown in the figure), the electrode 13 receives a second power supply voltage (not shown in the figure), and the first power supply voltage is greater than the second power supply voltage. In an embodiment of the present disclosure, the second power supply voltage is a ground voltage. When power supply voltages respectively applied to the liquid droplet 11 are V1 and V2, and V1 is not equal to V2, due to electrowetting effect, a shape of the liquid droplet 11 will be changed. Since the liquid droplet 11 itself has a function similar to a lens, the liquid droplet 11 with different shapes has different convergence abilities, and a convergence ability of the liquid lens 10 can be adjusted by voltages. In an embodiment of the present disclosure, referring back to FIG. 1, in order to reduce a thickness of the display panel, the liquid lenses 10 are disposed on a same horizontal plane. Of course, the setting method of the liquid lenses 10 is not limited to this.

Figure 4:
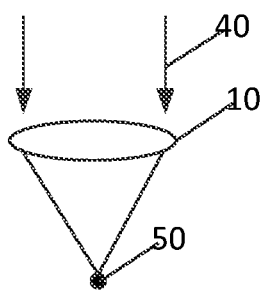
FIG. 4 is a schematic working principle diagram of a single liquid lens when the display panel of the present disclosure is in the first state.

Combined with FIG. 4, the liquid lenses 10 have focal points 50. In an embodiment of the present disclosure, the liquid lenses 10 are used to converge the light 40 incident thereon to form the focal points 50. The liquid lenses 10 have the light exiting side, the light 40 after passing through the lenses 10 will be converged, and a light energy density at the focal points 50 of the lenses is the greatest.

Referring back to FIG. 1, the light absorbing layer 20 is disposed on the light exiting side of the liquid lenses 10, the light absorbing layer 20 is provided with a plurality of grooves 21 corresponding to the liquid lenses 10, and the focal points 50 of the liquid lenses 10 are located in the corresponding grooves 21. In an embodiment, in order to improve aperture ratio, the grooves 21 correspond to the liquid lenses 10 by one-to-one. The grooves 21 have tops and bottoms, the bottoms are away from the liquid lenses 10, and the tops are adjacent to the liquid lenses 10.

In an embodiment of the present disclosure, in order to improve the aperture ratio, areas of the tops of the grooves are greater than areas of the bottoms of the grooves. Longitudinal cross-sectional shapes of the grooves 21 are inverted trapezoidal. In order to improve the aperture ratio, in an embodiment of the present disclosure, the grooves 21 penetrate through the light absorbing layer 20, and the reflective layer 30 is disposed on one side of the light absorbing layer 20 away from the liquid lenses 10. Of course, in other embodiments, the grooves 21 may not penetrate through the light absorbing layer 20, and depths of the grooves 21 are less than a thickness of the light absorbing layer 20.

In order to improve display effect, in an embodiment of the present disclosure, a material for the light absorbing layer 20 is a black matrix. Of course, the light absorbing layer 20 is preferably a non-metallic material. Wherein, in order to further improve the display effect, a sum of a spacing d between the light absorbing layer 20 and the liquid lenses 10 and a depth L of the grooves 21 is within a predetermined range which is set according to the focal points 50. That is, the sum of d and L is within the predetermined range. Preferably, the reflective layer 30 is in contact with the focal points 50.

The reflective layer 30 covers the bottoms of the grooves 21. In an embodiment of the present disclosure, as shown in FIG. 1, when the liquid lenses 10 are disposed on the top of the display panel, the light absorbing layer 20 is disposed under the liquid lenses 10, and the reflective layer 30 is disposed under the grooves 21. In an embodiment of the present disclosure, the reflective layer 30 includes a plurality of reflective parts 31 arranged at intervals, and the reflective parts 31 correspond to the grooves 21. In another embodiment of the present disclosure, the reflective layer 30 may be a whole layer structure.

In an embodiment of the present disclosure, when the display panel is in a first state, the grooves 21 are used to propagate the convergent light 40 of the corresponding liquid lenses 10 to the reflective layer 30, having the reflective layer 30 to reflect the convergent light 40.

When the display panel is in a second state, the liquid lenses 10 do not converge the light incident thereon. The first state is a bright state, and the second state is a dark state.

Figure 5:
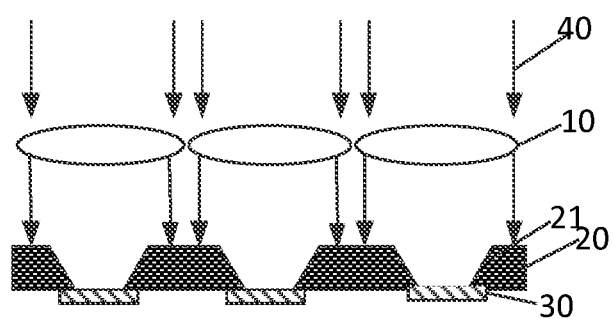
FIG. 5 is a schematic structural diagram of a display panel in a second state according to an embodiment of the present disclosure.

Taking the light being ambient light as an example, in a specific working process, taking FIG. 1 as an example, in the bright state, since the liquid lenses 10 converge the ambient light, and the light is propagated to the reflective layer 30 disposed on the bottoms of the grooves 21 through the grooves 21, the reflective layer 30 can reflect back most of the ambient light. As shown in FIG. 5, in the dark state, since the liquid lenses 10 have no convergence effect for the ambient light, the light energy density in the grooves 21 is very low, most of the ambient light is absorbed by the light absorbing layer 20, and only a small amount of ambient light is reflected. The display panel of the embodiment can achieve grayscale reflective display, that is, non-color display.

Through the liquid lenses, the light absorbing layer, and the reflective layer, the liquid lenses can achieve convergence and scattering of light, and change the intensity of the light per unit area under a synergistic effect with the grooves, thereby controlling an intensity of reflected light, preventing the reflected light from causing an influence on a display effect, and improving the display effect.

Figure 6:
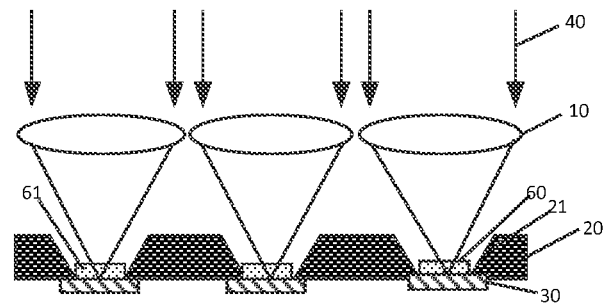
FIG. 6 is a schematic structural diagram of a display panel in a first state according to another embodiment of the present disclosure.

Referring to FIG. 6, FIG. 6 is a schematic structural diagram of a display panel in a first state according to another embodiment of the present disclosure.

The difference of the display panel in the embodiment from the previous embodiment is that the display panel in the embodiment can achieve full-color reflective display, and a structure of the display panel in the embodiment further includes a color resist layer.

As shown in FIG. 6, the color resist layer 60 in the embodiment includes a plurality of color filter resists 61, such as red color filter resists, green color filter resists, and blue color filter resists. The color filter resists 61 correspond to the grooves 21, and the color filter resists 61 are disposed in the grooves 21 and adjacent to the reflective layer 30. In an embodiment of the present disclosure, when the reflective layer 30 is disposed under the grooves 21, the color filter resists 61 are disposed on the reflective layer 30 and within the grooves 21.

A working principle of the display panel in the embodiment is the same as the previous embodiment.

An embodiment of the present disclosure further provides a display device, which comprises any one of the above display panels.

The display panel and the device of the present disclosure include: a plurality of liquid lenses having a light exiting side; a light absorbing layer disposed on the light exiting side of the liquid lenses, wherein the light absorbing layer is provided with a plurality of grooves corresponding to the liquid lenses, and focal points of the liquid lenses are located in the corresponding grooves; and a reflective layer covering bottoms of the grooves, wherein the bottoms of the grooves are away from the liquid lenses. Synergistic effect of the liquid lenses and the grooves changes an intensity of light per unit area, thereby controlling an intensity of reflected light, preventing the reflected light from causing an influence on display effect, and improving the display effect.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display panel, comprising:
   a plurality of liquid lenses having a light exiting side;
   a light absorbing layer disposed on the light exiting side of the liquid lenses, wherein the light absorbing layer is provided with a plurality of grooves corresponding to the liquid lenses, and focal points of the liquid lenses are located in the corresponding grooves; and
   a reflective layer covering bottoms of the grooves, wherein the bottoms of the grooves are away from the liquid lenses, and the reflective layer is in contact with the focal points of the liquid lenses.

2. The display panel according to claim 1, further comprising:
   a color resist layer comprising a plurality of color filter resists corresponding to the grooves, wherein the color filter resists are disposed in the grooves and adjacent to the reflective layer.

3. The display panel according to claim 1, wherein areas of tops of the grooves are greater than areas of the bottoms of the grooves, and the tops of the grooves are adjacent to a side of the liquid lenses.

4. The display panel according to claim 3, wherein longitudinal cross-sectional shapes of the grooves are inverted trapezoidal.

5. The display panel according to claim 1, wherein the grooves penetrate through the light absorbing layer, and the reflective layer is disposed on one side of the light absorbing layer away from the liquid lenses.

6. The display panel according to claim 1, wherein the liquid lenses are disposed on a same horizontal plane.

7. The display panel according to claim 1, wherein when the display panel is in a first state, the liquid lenses converge light incident thereon; and
   when the display panel is in a second state, the liquid lenses do not converge the light incident thereon.

8. The display panel according to claim 1, wherein each of the liquid lenses comprises a liquid droplet, an insulating layer, and an electrode in sequence from top to bottom, the liquid droplet receives a first power supply voltage, the electrode receives a second power supply voltage, and the first power supply voltage is greater than the second power supply voltage.

9. A display device, comprising a display panel, wherein the display panel comprises:
   a plurality of liquid lenses having a light exiting side;
   a light absorbing layer disposed on the light exiting side of the liquid lenses, wherein the light absorbing layer is provided with a plurality of grooves corresponding to the liquid lenses, and focal points of the liquid lenses are located in the corresponding grooves; and
   a reflective layer covering bottoms of the grooves, wherein the bottoms of the grooves are away from the liquid lenses, and the reflective layer is in contact with the focal points of the liquid lenses.

10. The display device according to claim 9, further comprising:
    a color resist layer comprising a plurality of color filter resists corresponding to the grooves, wherein the color filter resists are disposed in the grooves and adjacent to the reflective layer.

11. The display device according to claim 9, wherein areas of tops of the grooves are greater than areas of the bottoms of the grooves, and the tops of the grooves are adjacent to a side of the liquid lenses.

12. The display device according to claim 11, wherein longitudinal cross-sectional shapes of the grooves are inverted trapezoidal.

13. The display device according to claim 9, wherein the grooves penetrate through the light absorbing layer, and the reflective layer is disposed on one side of the light absorbing layer away from the liquid lenses.

14. The display device according to claim 9, wherein the liquid lenses are disposed on a same horizontal plane.

15. The display device according to claim 9, wherein when the display panel is in a first state, the liquid lenses converge light incident thereon; and
    when the display panel is in a second state, the liquid lenses do not converge the light incident thereon.

16. The display device according to claim 15, wherein the first state is a bright state, and the second state is a dark state.

17. The display device according to claim 9, wherein the reflective layer comprises a plurality of reflective parts corresponding to the grooves.

18. The display device according to claim 9, wherein each of the liquid lenses comprises a liquid droplet, an insulating layer, and an electrode in sequence from top to bottom, the liquid droplet receives a first power supply voltage, the electrode receives a second power supply voltage, and the first power supply voltage is greater than the second power supply voltage.

* * * * *